(12) United States Patent
Johannsen et al.

(10) Patent No.: US 8,336,970 B2
(45) Date of Patent: Dec. 25, 2012

(54) LINK AND LINK ASSEMBLY FOR TRACK-TYPE MACHINE

(75) Inventors: Eric James Johannsen, Washington, IL (US); Mark Steven Diekevers, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/314,750

(22) Filed: Dec. 16, 2008

(65) Prior Publication Data
US 2010/0148575 A1  Jun. 17, 2010

(51) Int. Cl.
B62D 55/205 (2006.01)
(52) U.S. Cl. .......................... 305/201; 305/198
(58) Field of Classification Search .................. 305/196, 305/197, 198, 200, 201, 202, 203, 204
See application file for complete search history.

(56) References Cited

U.S. PATENT DOCUMENTS

| | | | |
|---|---|---|---|
| 2,368,611 A | 1/1945 | Charnock | |
| 2,823,081 A | 2/1958 | Mayo | |
| 3,235,315 A | 2/1966 | Schnacke | |
| 3,381,983 A * | 5/1968 | Hanes | 285/321 |
| 3,801,163 A | 4/1974 | Khuntia | |
| 3,924,882 A * | 12/1975 | Ellis | 285/148.19 |
| 4,150,856 A | 4/1979 | Hakkenberg et al. | |
| 4,244,588 A | 1/1981 | Langewisch | |
| 4,288,172 A * | 9/1981 | Livesay et al. | 403/317 |
| 4,392,657 A | 7/1983 | Roley | |
| 4,428,589 A | 1/1984 | Reinsma | |
| 4,575,914 A | 3/1986 | Armida et al. | |
| 4,618,190 A * | 10/1986 | Garman et al. | 305/204 |
| 5,009,017 A | 4/1991 | Diekevers et al. | |
| 5,257,858 A | 11/1993 | Taft | |
| 5,711,586 A * | 1/1998 | Anderton et al. | 305/201 |
| 5,829,849 A | 11/1998 | Lawson | |
| 5,887,958 A | 3/1999 | Bissi et al. | |
| 6,142,588 A | 11/2000 | Ketting et al. | |
| 6,206,491 B1 | 3/2001 | Hisamatsu | |
| 6,386,651 B1 * | 5/2002 | Gerardin et al. | 305/100 |
| 6,390,572 B1 | 5/2002 | Idetsu et al. | |
| 6,564,539 B2 * | 5/2003 | Bedford et al. | 59/7 |
| 6,739,680 B2 | 5/2004 | Hasselbusch et al. | |
| 6,886,323 B2 * | 5/2005 | Yamamoto | 59/7 |
| 6,926,460 B2 * | 8/2005 | Yamamoto et al. | 403/315 |
| 7,325,889 B2 | 2/2008 | Yamamoto et al. | |
| 7,347,513 B2 * | 3/2008 | Johannsen et al. | 305/203 |
| 7,661,774 B2 * | 2/2010 | Yamamoto et al. | 305/201 |
| 2002/0062638 A1 | 5/2002 | Bedford et al. | |
| 2003/0090151 A1 | 5/2003 | Takeno et al. | |
| 2006/0181151 A1 | 8/2006 | Wodrich et al. | |
| 2008/0265667 A1 * | 10/2008 | Livesay | 305/202 |

FOREIGN PATENT DOCUMENTS

KR 1020080038632 5/2008

OTHER PUBLICATIONS

Komatsu PLUS Parallel Link Undercarriage System, copyrighted in 2008 by Komatsu America Corp., published in USA (4 pages).

* cited by examiner

*Primary Examiner* — Kip T Kotter

(74) *Attorney, Agent, or Firm* — Finnegan, Henderson, Farabow, Garrett & Dunner LLP

(57) ABSTRACT

A link for a track-type machine is disclosed. The link may have a body portion. The link may also have an aperture extending through the body portion. The aperture may have a cylindrical portion. Additionally, the aperture may have an annular groove formed in the cylindrical portion. The aperture may also have a tapered portion. The tapered portion may abut the cylindrical portion, and may taper toward the cylindrical portion.

20 Claims, 4 Drawing Sheets

US 8,336,970 B2

LINK AND LINK ASSEMBLY FOR TRACK-TYPE MACHINE

TECHNICAL FIELD

The present disclosure relates generally to a link assembly for a track-type machine and, more particularly, to a link of a link assembly for a track-type machine.

BACKGROUND

Some link assemblies used on track-type machines include a pair of parallel track chains, which include a plurality of links that are interconnected by laterally disposed pins. A bushing is disposed about each pin such that it may rotate relative to the pin and the links. Additionally, two seal inserts in the form of bearings are disposed about each pin such that they may rotate relative to the pin. The seal inserts are positioned outward of the track bushing to provide sealing faces for seals. These seals prevent contaminants from mixing with lubricant positioned between the bushing and the pin. Additionally, each seal insert connects to one link to prevent the seal insert, the pin, and the bushing from moving laterally relative to the link.

One way to connect a bearing to a link is disclosed in U.S. Pat. No. 5,829,849 (the '849 patent) issued to Lawson on Nov. 3, 1998. The '849 patent describes press-fitting a sleeve bearing into a bore of a link to provide a sealing face for a track seal, which is positioned on one side of the sleeve bearing.

SUMMARY

In one aspect, the present disclosure is related to a link for a track-type machine. The link may include a body portion. The link may also include an aperture extending through the body portion. The aperture may include a cylindrical portion. Additionally, the aperture may include an annular groove formed in the cylindrical portion. The aperture may also include a tapered portion. The tapered portion may abut the cylindrical portion, and may taper toward the cylindrical portion.

In another aspect, the present disclosure is related to a link assembly for a track-type machine. The link assembly may include a link, which may include a body portion. The link may also include an aperture extending through the body portion. The aperture may include a cylindrical portion. Additionally, the aperture may include an aperture recess formed in the cylindrical portion. The aperture recess may include an aperture recess open end and an aperture recess closed end. The link assembly may also include a cylindrical seal insert, which may include a seal insert recess. The seal insert recess may include a seal insert recess open end and a seal insert recess closed end. The seal insert may be configured such that the aperture recess open end overlaps the seal insert recess open end when the seal insert is positioned within the aperture.

In yet another aspect, the present disclosure is related to a method of assembling a link assembly for a track-type machine. The link assembly may include a link, which may include a body portion and an aperture extending through the body portion. The link assembly may also include a seal insert and a retaining mechanism. The method may include compressing the retaining mechanism at least partially into a seal insert recess of the seal insert such that the retaining mechanism and the seal insert fit within a cylindrical portion of the aperture. The method may also include positioning the retaining mechanism and the seal insert within the aperture such that the retaining mechanism expands at least partially into an aperture recess formed in the cylindrical portion of the aperture.

DETAILED DESCRIPTION

Figure 1:
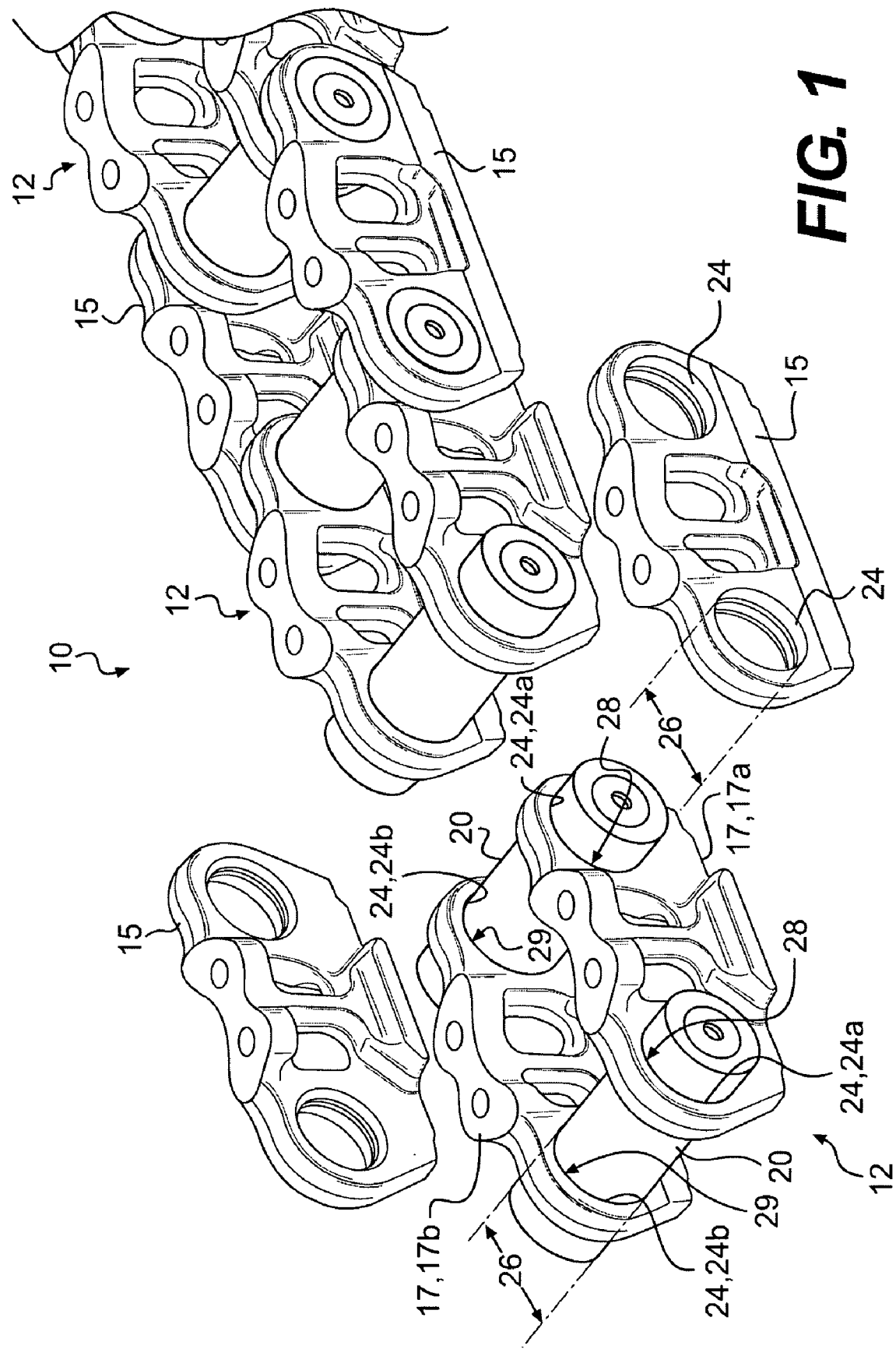
FIG. 1 is a pictorial view of an exemplary disclosed link assembly for an exemplary disclosed track-type machine.

FIG. 1 illustrates an exemplary link assembly 10 for a track-type machine. For example, the track-type machine may be a loader, an excavator, a tractor, a tank, or another mobile machine having track-type traction devices. Link assembly 10 may include a series of box sections 12 joined together by outer links 15. Each box section 12 may include two inner links 17 (inner links 17a and 17b) that are connected by two laterally disposed cartridges 20. Inner links 17 may or may not be equivalent to outer links 15. For example, both outer links 15 and inner links 17 may include apertures 24 having minimum diameters 26. In particular, an inner link 17a may have two apertures 24a. And, a first end 28 of one cartridge 20 may be interference-fit into each of apertures 24a (hereafter "aperture 24a"). Similarly, an inner link 17b may have two apertures 24b. And, a second end 29 of one cartridge 20 may be interference-fit into each of apertures 24b (hereafter "aperture 24b"). It is contemplated, however, that these interference-fits may not adequately prevent undesirable lateral movement of cartridge 20 relative to inner links 17. Therefore, each of apertures 24 (hereafter "aperture 24") and each of cartridges 20 (hereafter "cartridge 20") may be configured such that a retaining mechanism 32 (referring to FIG. 2) may be used to prevent lateral movement of cartridge 20 relative to inner links 17.

Figure 2:
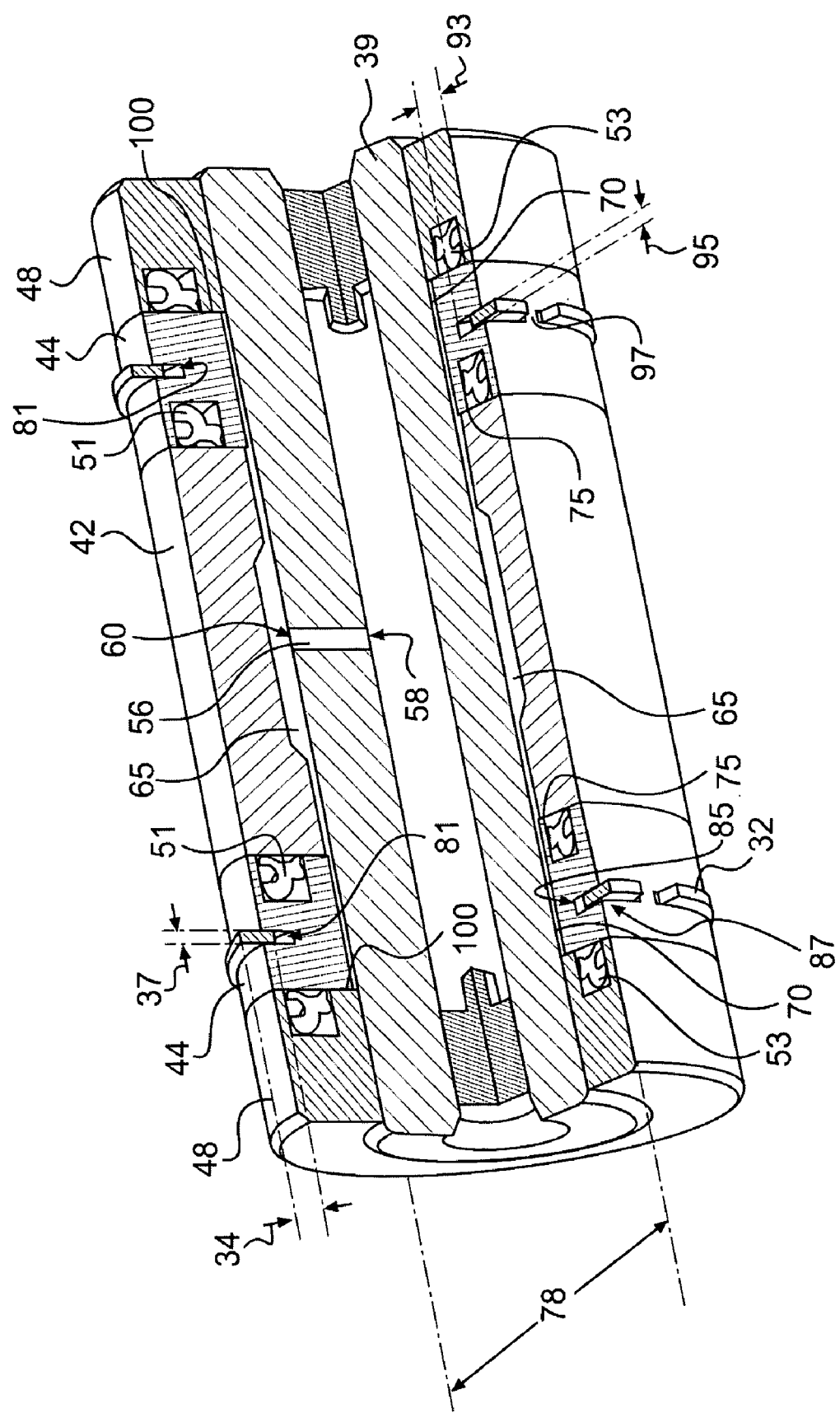
FIG. 2 is a cutaway view of an exemplary disclosed cartridge of the link assembly of FIG. 1.

As illustrated in FIG. 2, retaining mechanism 32 may include a snap ring having a rectangular cross-section. Alternatively, retaining mechanism 32 may include a snap ring have a circular cross-section. In yet another alternative, retaining mechanism 32 may include a snap ring having a cross-section that is neither rectangular nor circular. In any case, retaining mechanism 32 may be sized to withstand lateral forces generated by the operation of track-type machines. For example, retaining mechanism 32 may have a retaining mechanism depth 34 that is between approximately 3% and approximately 10% of minimum diameter 26. Additionally, retaining mechanism 32 may have a retaining mechanism width 37 that is between approximately 1% and approximately 9% of minimum diameter 26.

Cartridge 20 may include a pin 39, a bushing 42, two seal inserts 44, two collars 48, two seals 51, and two seals 53. Pin 39 may be a hollow cylinder, and may be filled with a lubricant that may flow into and out of pin 39 via a channel 56 having an inner end 58 and an outer end 60. For example, the lubricant may be a natural oil, a synthetic oil, or another lubricant known in the art.

Bushing 42 may be positioned along pin 39 such that an inner surface of bushing 42 overlaps outer end 60 of channel 56. Such an arrangement may allow the lubricant to flow out of pin 39 and into a gap 65 (between pin 39 and bushing 42), reducing rotational friction between bushing 42 and pin 39, and allowing bushing 42 to rotate freely with respect to pin 39.

Seal inserts 44 may be positioned along pin 39 outward of bushing 42 such that the lubricant may flow from gap 65 to gaps 70 (between pin 39 and seal inserts 44). The lubricant in gaps 70 may reduce rotational friction between seal inserts 44 and pin 39, allowing seal inserts 44 to rotate with respect to pin 39. However, because gaps 70 may be narrower than gap 65, seal inserts 44 may rotate less freely than bushing 42. Thus, seal inserts 44 and bushing 42 may not rotate about pin 39 in unison. Instead, seal inserts 44 may rotate relative to bushing 42. The lubricant may also flow outward from gap 65 and gaps 70 into gaps 75 (between seal inserts 44 and bushing 42). But, it may be desirable to prevent the lubricant from flowing out of cartridge 20 via gaps 75, and to prevent contaminants from flowing into cartridge 20 via gaps 75. Therefore, seals 51 may be positioned at least partially within seal inserts 44. Seal inserts 44 may each include a first wall and a second wall defining an annular channel. The annular channel of each seal insert 44 may be configured to receive a seal 51 between the first wall and the second wall of each seal insert 44. Each of seals 51 may contact bushing 42, sealing one seal insert 44 against bushing 42, and blocking one gap 75.

As previously discussed, each cartridge 20 may be configured such that retaining mechanism 32 may be used to prevent lateral movement of cartridge 20 relative to inner links 17. In particular, each of seal inserts 44 (hereafter "seal insert 44") may be configured such that it may be used to prevent lateral movement of cartridge 20 relative to inner links 17. Specifically, seal insert 44 may be cylindrically shaped, and may have a diameter 78 sized such that seal insert 44 may be interference-fit into aperture 24. Alternatively, diameter 78 may be smaller than minimum diameter 26 of aperture 24, and seal insert 44 may not be interference-fit into aperture 24. Additionally, seal insert 44 may have a seal insert recess 81. Retaining mechanism 32 may be compressed at least partially into seal insert recess 81. Specifically, retaining mechanism 32 may be compressed against a closed end 85 of seal insert recess 81 (opposite an open end 87 of seal insert recess 81) such that retaining mechanism 32 and seal insert 44 both fit within a cylindrical portion 90 (referring to FIG. 3) of aperture 24, discussed below. For example, seal insert recess 81 may have a seal insert recess depth 93 that is between approximately 4% and approximately 11% of minimum diameter 26. Additionally, seal insert recess 81 may have a seal insert recess width 95 that is between approximately 1% and approximately 10% of minimum diameter 26. Although seal insert recess 81 may include an annular groove, it should be understood that seal insert recess 81 may alternatively include a non-annular groove. For example, as illustrated in FIG. 2, seal insert recess 81 may include a groove that is intersected by an alignment portion 97, which may prevent retaining mechanism 32 from rotating relative to seal insert 44.

Collars 48 may be positioned along pin 39 outward of seal inserts 44. Collars 48 may be attached to pin 39 such that the lubricant cannot flow between collars 48 and pin 39, and such that collars 48 cannot move relative to pin 39. For example, collars 48 may be welded to pin 39. The lubricant may flow outward from gaps 70 into gaps 100 (between seal inserts 44 and collars 48). But, it may be desirable to prevent the lubricant from flowing out of cartridge 20 via gaps 100, and to prevent contaminants from flowing into cartridge 20 via gaps 100. Therefore, a seal 53 may be positioned at least partially within each collar 48. Collars 48 may each include a first wall and a second wall defining an annular channel. The channel of each collar 48 may be configured to receive a seal 53 between the first wall and the second wall of each collar 48. Each seal 53 may contact one seal insert 44, sealing each collar 48 against one seal insert 44, and blocking one gap 100.

Figure 3:
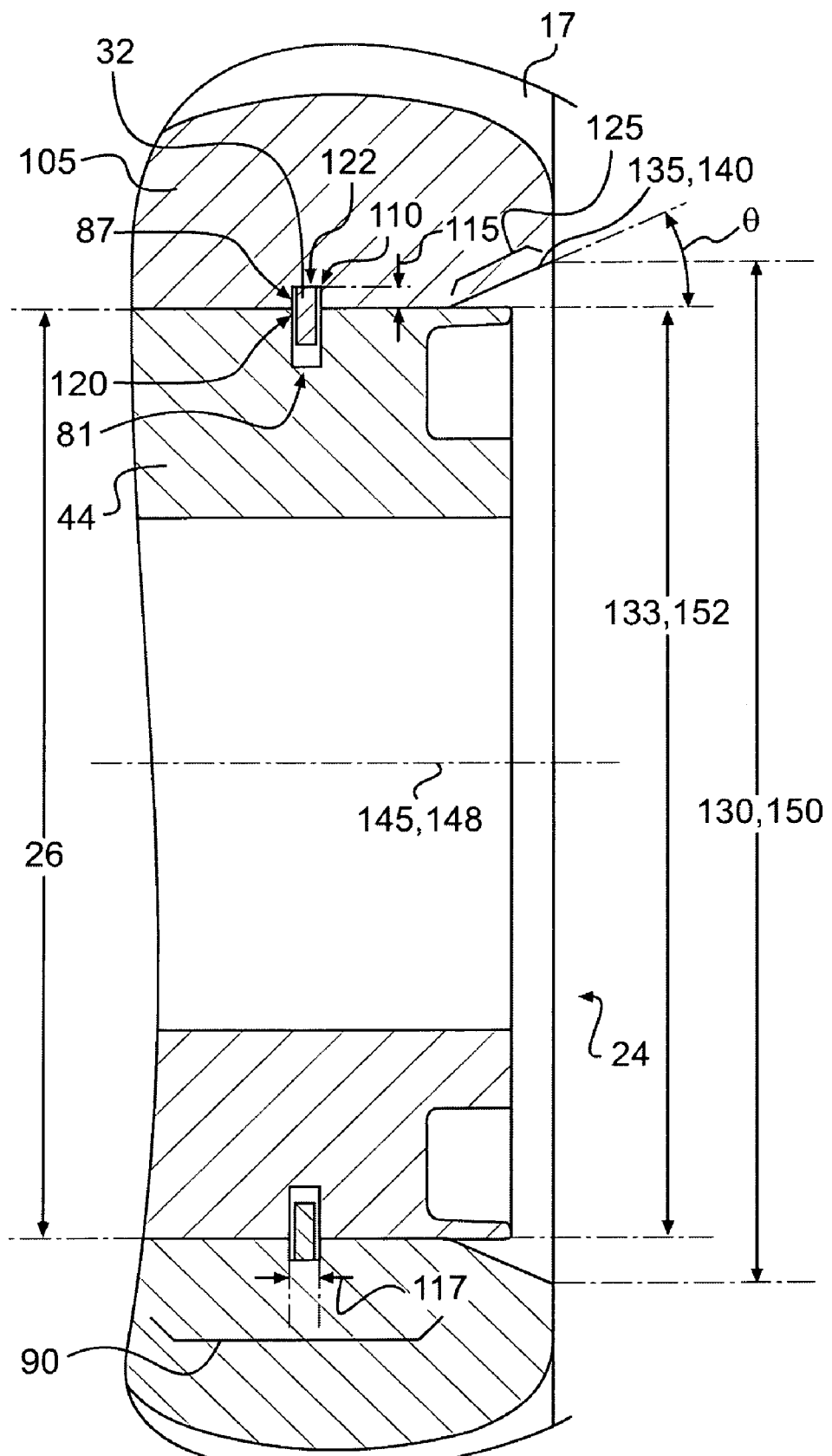
FIG. 3 is a cross-sectional side view of an exemplary disclosed seal insert of the cartridge of FIG. 2 connected to an exemplary disclosed link of the link assembly of FIG. 1.

As illustrated in FIG. 3, inner link 17 may include a body portion 105 through which aperture 24 extends. As previously discussed, aperture 24 may be configured such that retaining mechanism 32 may be used to prevent lateral movement of cartridge 20 relative to inner links 17. In particular, aperture 24 may include a cylindrical portion 90 having minimum diameter 26. An aperture recess 110 may be formed into cylindrical portion 90, and may be configured to receive retaining mechanism 32. Specifically, aperture recess 110 may have an aperture recess depth 115 that is between approximately 2% and approximately 11% of minimum diameter 26. Additionally, aperture recess 110 may have an aperture recess width 117 that is between approximately 1% and approximately 10% of minimum diameter 26. Although aperture recess 110 may include an annular groove, it should be understood that aperture recess 110 may alternatively include a non-annular groove. For example, like seal insert recess 81, aperture recess 110 may include a groove that is intersected by an alignment portion (not shown), which may prevent retaining mechanism 32 from rotating relative to aperture 24. In any case, it should be noted that aperture recess 110 may be positioned laterally along aperture 24 such that aperture recess 110 is alignable with seal insert recess 81 when seal insert 44 is positioned within aperture 24. In other words, an open end 120 of aperture recess 110 (opposite to a closed end 122 of aperture recess 110) may be overlapped by open end 87 of seal insert recess 81 when seal insert 44 is positioned within aperture 24. Alternatively, seal insert recess 81 may be positioned laterally along seal insert 44 such that seal insert recess 81 is alignable with aperture recess 110 when seal insert 44 is positioned within aperture 24. In other words, open end 87 of seal insert recess 81 may be overlapped by open end 120 of aperture recess 110 when seal insert 44 is positioned within aperture 24.

In some embodiments, aperture 24 may also include a tapered portion 125, which may be configured to compress retaining mechanism 32 at least partially into seal insert recess 81 such that retaining mechanism 32 and seal insert 44 both fit within cylindrical portion 90. In particular, tapered portion 125 may abut cylindrical portion 90, and may taper toward cylindrical portion 90. Specifically, tapered portion 125 may have a maximum diameter 130 that is at least approximately 5% larger than minimum diameter 26. More specifically, maximum diameter 130 may be between approximately 5% and approximately 27% larger than minimum diameter 26. And, tapered portion 125 may have a minimum diameter 133 that is equivalent to minimum diameter 26. As cartridge 20 and retaining mechanism 32 are inserted into cylindrical potion 90 via tapered portion 125, the taper of tapered portion 125 may compress retaining mechanism 32 at least partially into seal insert recess 81.

As illustrated in FIG. 3, tapered portion 125 may include a surface 135 of a truncated right circular cone 140. Cone 140 may have a central axis 145 that is collinear with a central axis 148 of aperture 24. In some embodiments, surface 135 may have a maximum diameter 150 that is equivalent to maximum diameter 130. Additionally, surface 135 may have a minimum diameter 152 that is equivalent to minimum diameters 26 and 133. In other embodiments, maximum diameter 150 may not be equivalent to maximum diameter 130 and/or minimum diameter 152 may not be equivalent to minimum diameters 26 and/or 133. In any case, an angle θ between surface 135 and central axis 145 may be between approximately 5° and approximately 45°. More specifically, angle θ may be between approximately 10° and approximately 15°.

Figure 4:
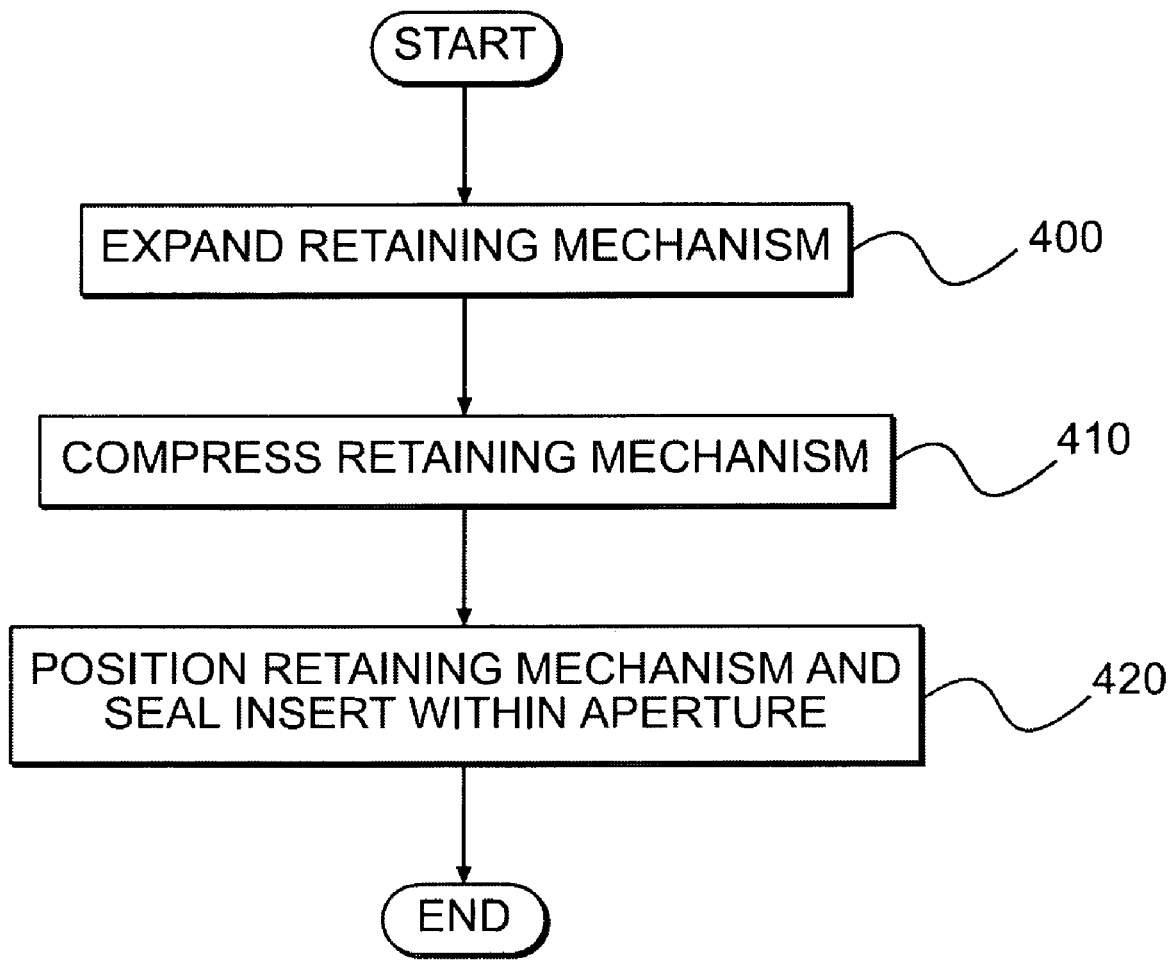
FIG. 4 is a flow chart describing an exemplary disclosed method of assembling the link assembly of FIG. 1.

FIG. 4 illustrates an exemplary method of assembling link assembly 10. FIG. 4 will be discussed in the following section to further illustrate link assembly 10 and its assembly.

INDUSTRIAL APPLICABILITY

In general, a link assembly may be applicable to track-type machines. The disclosed link and link assembly may be particularly beneficial when applied to track-type machines having link assemblies including seal inserts positioned within apertures of links. Specifically, a retaining mechanism may be used to prevent lateral movement of the seal inserts relative to the links. A method of assembling the disclosed link assembly will now be described.

As illustrated in FIG. 4, a retaining mechanism may first be expanded (step 400). Specifically, the retaining mechanism may be expanded such that it may be moved along a seal insert and positioned around and/or partially within a seal insert recess of the seal insert. Although a cartridge including the seal insert may not be assembled until after step 400, it is contemplated that the cartridge may be assembled before step 400. Therefore, in some embodiments, the retaining mechanism may be expanded such that it may also be moved along a bushing and/or a collar of the cartridge before being positioned around and/or partially within the seal insert recess.

Next, the retaining mechanism may be compressed at least partially into the seal insert recess (step 410). This compression of the retaining mechanism may allow the retaining mechanism and the seal insert to fit within a cylindrical portion of an aperture of an inner link. It should be noted, however, that the seal insert may be interference-fit into the aperture. Therefore, it should be understood that "fit" merely means that the retaining mechanism and the seal insert may be inserted into a cylindrical portion of the aperture. It is contemplated that the compression of step 410 may or may not include the use of a tool. For example, snap ring pliers may be used to compress the retaining mechanism such that the retaining mechanism may fit within the cylindrical portion. Alternatively, the retaining mechanism may be compressed by inserting the retaining mechanism and the seal insert into the cylindrical portion via a tapered portion of the aperture. Specifically, as the retaining mechanism is moved through the tapered portion, a taper of the tapered portion may compress the retaining mechanism such that the retaining mechanism may fit within the cylindrical portion.

After step 410, the retaining mechanism and the seal insert may be positioned within the aperture (step 420). Specifically, the retaining mechanism and the seal insert may be moved laterally relative to the inner link until the seal insert recess aligns with an aperture recess of the aperture. Once the seal insert recess aligns with the aperture recess, the retaining mechanism may expand at least partially into the aperture recess. At this time, the retaining mechanism may be positioned at least partially within the seal insert recess, and at least partially within the aperture recess. Therefore, the retaining mechanism may prevent lateral movement of the seal insert relative to the inner link. This is because it may not be possible to move the seal insert laterally relative to the inner link without breaking the retaining mechanism.

Alternatively, another method may be used to assemble the disclosed link assembly. For example, this method may include expanding the retaining mechanism at least partially into the aperture recess such that the seal insert may be moved laterally relative to the inner link. Once the seal insert recess aligns with the aperture recess, the retaining mechanism may compress at least partially into the seal insert recess. At this time, the retaining mechanism may be positioned at least partially within the aperture recess, and at least partially within the seal insert recess. Therefore, as previously discussed, the retaining mechanism may prevent lateral movement of the seal insert relative to the inner link.

Regardless of how the disclosed link assembly is assembled, it is contemplated that the positioning of the retaining mechanism (at least partially within both the seal insert recess and the aperture recess) may also prevent lateral movement of the cartridge relative to the inner link. This is because the cartridge may include two collars positioned outward of two seal inserts and one bushing. Since the collars may be attached to a pin such that the collars cannot move relative to the pin, the collars may prevent the seal inserts and the bushing from moving laterally relative to the pin. Therefore, when the retaining mechanism prevents lateral movement of the seal insert relative to the inner link, the retaining mechanism may also prevent lateral movement of the cartridge (including the collars, the seal inserts, the bushing, and the pin) relative to the inner link.

What is claimed is:

1. A link assembly for a track-type machine, the link assembly comprising:
a link, including:
a body portion, and
an aperture extending through the body portion;
a cylindrical portion surrounding the aperture, and
an aperture recess formed in the cylindrical portion, the aperture recess including an aperture recess open end and an aperture recess closed end;
a cylindrical seal insert positioned in the aperture, wherein an outer surface of the seal insert creates an interference fit with an inner surface of the cylindrical portion, the seal insert defining a longitudinal axis and having a seal insert recess, the seal insert recess including a seal insert recess open end and a seal insert recess closed end, wherein the seal insert is configured such that the aperture recess open end overlaps the seal insert recess open end when the seal insert is positioned within the aperture, and
a retaining mechanism configured to be positioned at least partially within the aperture recess and, concurrently, at least partially within the seal insert recess, the retaining mechanism being configured to prevent axial movement of the link relative to the seal insert in both a first axial direction and a second axial direction.

2. The link assembly of claim 1, further including a tapered portion surrounding the aperture, wherein the tapered portion abuts the cylindrical portion and the tapered portion tapers toward the cylindrical portion.

3. The link assembly of claim 2, wherein a maximum diameter of the tapered portion is at least approximately 5% larger than a minimum diameter of the aperture.

4. The link assembly of claim 3, wherein the maximum diameter of the tapered portion is between approximately 5% and approximately 27% larger than the minimum diameter of the aperture.

5. The link assembly of claim 2, wherein the tapered portion includes a truncated right circular cone having a central axis and a surface.

6. The link assembly of claim 5, wherein an angle between the central axis and the surface is between approximately 5° and approximately 45°.

7. The link assembly of claim 1, wherein:
the aperture recess includes a first annular groove; and
the seal insert recess includes a second annular groove.

8. The link assembly of claim 1, wherein:
a width of the aperture recess is between approximately 1% and approximately 10% of a minimum diameter of the aperture; and
a width of the seal insert recess is between approximately 1% and approximately 10% of the minimum diameter of the aperture.

9. The link assembly of claim 1, wherein a depth of the aperture recess is between approximately 2% and approximately 11% of a minimum diameter of the aperture.

10. The link assembly of claim 1, wherein a depth of the seal insert recess is between approximately 4% and approximately 11% of a minimum diameter of the aperture.

11. A method of assembling a link assembly for a track-type machine, the link assembly including a link having a body portion and an aperture extending through the body portion, a seal insert defining a longitudinal axis, and a retaining mechanism, the method comprising:
compressing the retaining mechanism at least partially into a seal insert recess of the seal insert such that the retaining mechanism and the seal insert fit within a cylindrical portion of the link surrounding the aperture; and
positioning the retaining mechanism and the seal insert within the aperture such that the retaining mechanism expands at least partially into an aperture recess formed in the cylindrical portion of the link and prevents axial movement of the link relative to the seal insert in both a first axial direction and a second axial direction, wherein an outer surface of the seal insert creates an interference fit with an inner surface of the cylindrical portion.

12. The method of claim 11, wherein compressing the retaining mechanism at least partially into a seal insert recess of the seal insert includes inserting the retaining mechanism and the seal insert into the cylindrical portion of the aperture via a tapered portion of the link surrounding the aperture, the tapered portion tapering toward the cylindrical portion such that the retaining mechanism is compressed as it passes through the tapered portion.

13. A link assembly for a track-type machine, the link assembly comprising:
a link, including:
a body portion, and
an aperture extending through the body portion;
a cylindrical portion surrounding the aperture, and
an aperture recess formed in the cylindrical portion, the aperture recess including an aperture recess open end and an aperture recess closed end;
a cartridge including:
a cylindrical seal insert positioned in the aperture, wherein an outer surface of the seal insert creates an interference fit with an inner surface of the cylindrical portion, the seal insert defining a longitudinal axis and having a seal insert recess, the seal insert recess including a seal insert recess open end and a seal insert recess closed end, wherein the seal insert is configured such that the aperture recess open end overlaps the seal insert recess open end when the seal insert is positioned within the aperture, and
a retaining mechanism configured to be positioned at least partially within the aperture recess and, concurrently, at least partially within the seal insert recess, the retaining mechanism being configured to prevent axial movement of the link relative to the seal insert in both a first axial direction and a second axial direction.

14. The link assembly of claim 13, wherein the cartridge further includes a collar located adjacent to the seal insert, wherein the collar includes a first wall and a second wall defining an annular channel, the channel of the collar being configured to receive a seal between the first wall and the second wall of the collar.

15. The link assembly of claim 14, wherein the collar includes a seal.

16. The link assembly of claim 14, wherein the channel of the seal insert and the channel of the collar each have a substantially rectangular cross-section.

17. The link assembly of claim 13, further including a tapered portion surrounding the aperture, wherein the tapered portion abuts the cylindrical portion and the tapered portion tapers toward the cylindrical portion.

18. The link assembly of claim 17, wherein a maximum diameter of the tapered portion is at least approximately 5% larger than a minimum diameter of the aperture.

19. The link assembly of claim 13, wherein the cartridge further includes a pin.

20. The link assembly of claim 13, wherein the retaining mechanism is a snap ring.

* * * * *